(12) United States Patent
Georgin

(10) Patent No.: US 9,766,638 B2
(45) Date of Patent: Sep. 19, 2017

(54) METHOD OF DETECTING AN ELECTRIC ACTUATOR WITH DECREASED EFFICIENCY

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 360 days.

(21) Appl. No.: 14/561,762

(22) Filed: Dec. 5, 2014

(65) Prior Publication Data

US 2016/0161954 A1 Jun. 9, 2016

(51) Int. Cl.
G05B 15/02 (2006.01)
G05D 15/01 (2006.01)
H02P 6/18 (2016.01)
G05F 1/10 (2006.01)

(52) U.S. Cl.
CPC .............. *G05D 15/01* (2013.01); *G05B 15/02* (2013.01); *G05F 1/10* (2013.01); *H02P 6/18* (2013.01)

(58) Field of Classification Search
CPC .......... G05B 15/02; G05D 15/01; G05F 1/10; H02P 6/18
USPC .......................................................... 700/275
See application file for complete search history.

(56) References Cited

U.S. PATENT DOCUMENTS

| | | | |
|---|---|---|---|
| 3,849,759 A * | 11/1974 | Hosaka | B60K 28/14 340/436 |
| 5,615,064 A | 3/1997 | Blank et al. | |
| 6,363,214 B1 | 3/2002 | Merello et al. | |
| 6,392,375 B1 | 5/2002 | Portaluri et al. | |
| 8,058,894 B2 * | 11/2011 | De Cock | H02P 8/38 324/765.01 |
| 9,280,858 B2 * | 3/2016 | Cahill | B60T 17/221 |
| 9,387,837 B2 * | 7/2016 | Yokoyama | B60T 1/065 |
| 2008/0203224 A1 * | 8/2008 | Yount | B64C 13/42 244/99.5 |
| 2010/0244887 A1 | 9/2010 | De Cock et al. | |
| 2010/0292889 A1 * | 11/2010 | Cahill | B60T 8/1703 701/29.1 |
| 2015/0217748 A1 * | 8/2015 | Chico | B60T 17/221 701/3 |

OTHER PUBLICATIONS

Extended European Search Report dated Jul. 21, 2016 in European Application No. 15197980.4.

\* cited by examiner

*Primary Examiner* — Chun Cao
(74) *Attorney, Agent, or Firm* — Snell & Wilmer, L.L.P.

(57) ABSTRACT

An electronic actuator control system and method ("system") are provided. The system may comprise an electro-mechanical actuator (EMA) configured to generate a force and an electro-mechanical actuator controller (EMAC) electrically coupled to the EMA. The EMAC may include a non-transitory memory communicating with the EMAC, the non-transitory memory having instructions stored thereon that, in response to execution by the EMAC, cause a processor to perform operations. The operations carried out by the EMAC may comprise commanding the EMA to apply a force, determining an expected voltage in response to the force, measuring a voltage generated by the EMA, and comparing the voltage generated by the EMA to the expected voltage.

13 Claims, 3 Drawing Sheets

METHOD OF DETECTING AN ELECTRIC ACTUATOR WITH DECREASED EFFICIENCY

FIELD OF INVENTION

The present disclosure relates to electronic brake systems, and, more specifically, to a method of detecting decreased efficiency in electric actuators.

BACKGROUND

Most mechanical components wear with time. An electro-mechanical actuator (EMA) is no different. Over time, the efficiency of an EMA may degrade due to internal wear and other factors. Reduced efficiency may result in slower response times and higher power consumption. Ultimately, an EMA may even fail as a result of wear. In an aircraft application, for example, EMA failure may have undesired side effects such as brake failure. Reduced efficiency in an EMA may be a precursor to complete failure.

SUMMARY

An electronic actuator control system and method ("system") are provided. The system may comprise an electro-mechanical actuator (EMA) configured to generate a force and an electro-mechanical actuator controller (EMAC) electrically coupled to the EMA. The EMAC may include a non-transitory memory communicating with the EMAC, the non-transitory memory having instructions stored thereon that, in response to execution by the EMAC, cause a processor to perform operations. The operations carried out by the EMAC may comprise commanding the EMA to apply a force, determining an expected voltage in response to the force, measuring a voltage generated by the EMA, and comparing the voltage generated by the EMA to the expected voltage.

In various embodiments, the system may further comprise cutting power to the EMA after commanding the EMA to apply the force. The voltage may be generated by the EMA in response to the EMAC cutting power to the EMA. Determining the expected voltage may include looking up the force in a lookup table. The lookup table may associate the force with the expected voltage. The lookup table may also associate the force with a minimum voltage threshold. The system may further include generating a repair signal in response to the voltage being less than the minimum voltage threshold. The minimum voltage threshold may be 50% of the expected voltage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
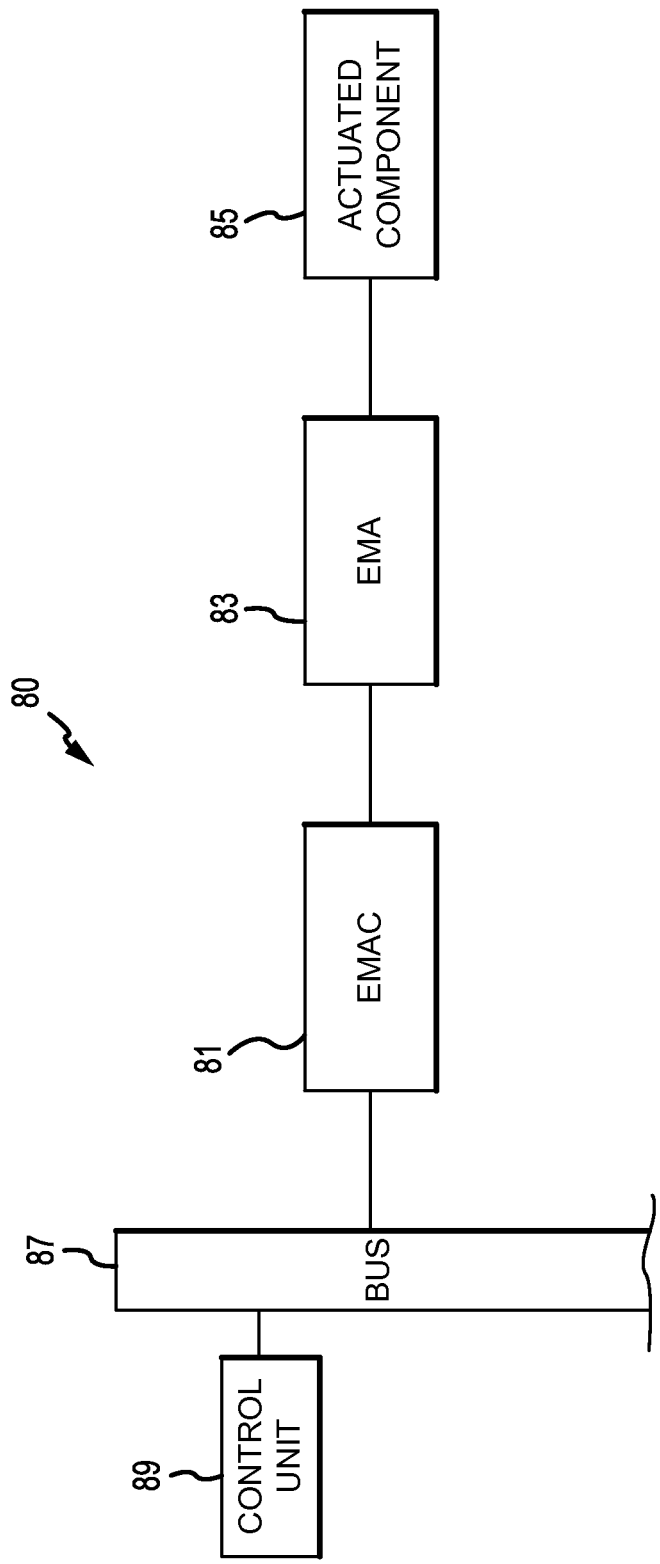
FIG. 1 illustrates an exemplary system for detecting potential EMA failure, in accordance with various embodiments.

With reference to FIG. 1, an exemplary actuator control system 80 may have an electro-mechanical actuation controller 81 ("EMAC"), an electro-mechanical actuator (EMA) 83, and an actuated component 85. The EMAC 81 may provide force commands to the EMA 83 directing the EMA 83 to cause actuated component 85 to mechanically operate (e.g., moving aircraft brakes). For example, the EMAC 81 may be responsible for executing brake actuation instructions received via a logical connection, such as a controller area network ("CAN") bus 87, from other aircraft systems, such as a control unit 89 (e.g., a full authority digital controller or a brake control unit). In this manner, the actuator may be operated. In further embodiments, the EMAC 81 may provide force commands to more than one EMA 83, for example, a first EMA and a second EMA, or any number of EMAs, in order to operate more than one component (e.g., a first brake assembly and a second brake assembly in concert).

As discussed herein, various aspects of the present disclosure may be implemented in various logical units of a processor having a non-transitory memory. In various embodiments, various aspects may be implemented in multiple processors and/or memories. For example, the disclosed system may be implemented within the EMAC 81.

Alternatively, various aspects of the disclosed system may be implemented within the EMAC 81 and/or the EMA 83 and/or control unit 89.

Figure 2:
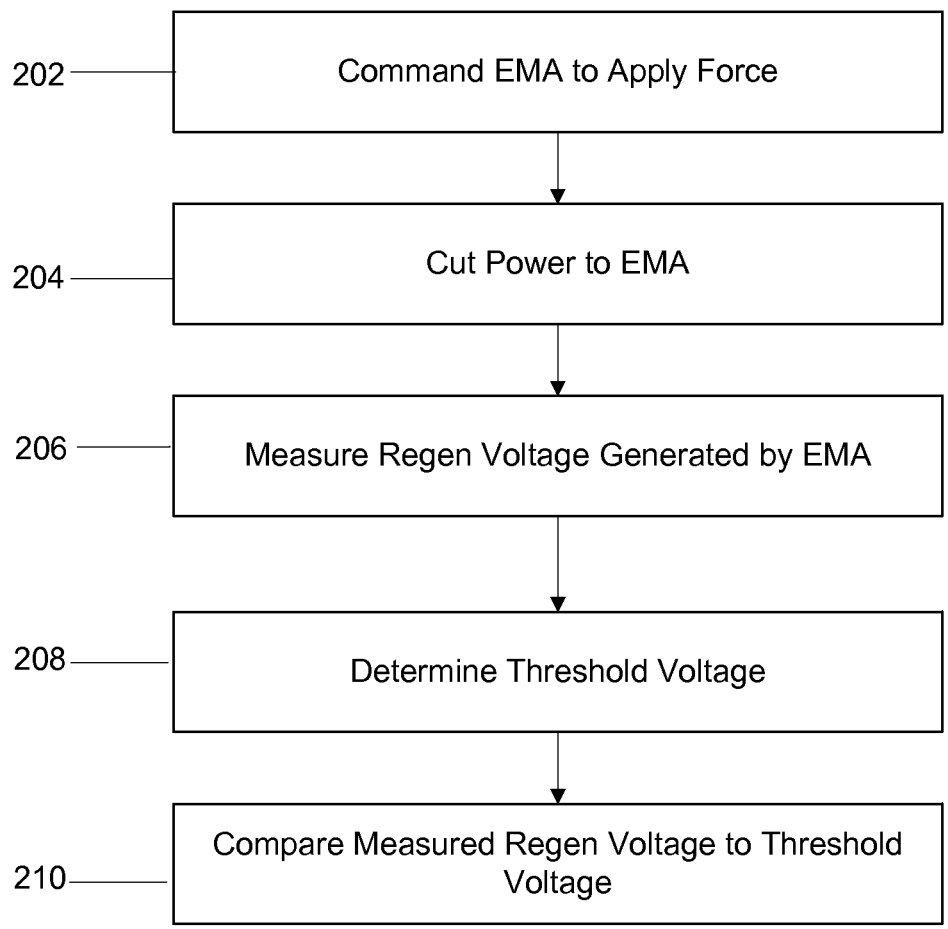
FIG. 2 illustrates a flowchart of an exemplary method for detecting EMA failure and/or reduced efficiency, in accordance with various embodiments.

With reference to FIG. 2, an exemplary method 200 of detecting EMA failure based on reduced efficiency is shown. Actuator control system 80 of FIG. 1 may be configured to carry out the steps of method 200. For example, EMAC 81 from FIG. 1 may carry out the steps of method 200. EMAC 81 may execute method 200 each time an aircraft is started. EMAC 81 may also execute method 200 multiple times to ensure the test results are accurate.

In various embodiments, EMAC 81 may command EMA 83 to apply a force (Step 202). The force may be of a predetermined amount. For example, EMA 83 may be a brake actuator commanded to apply a predetermined force so that the regenerative voltage produced when the brake releases may be predicted. EMAC 81 may then cut power to EMA 83 or otherwise command EMA 83 to release (Step 204). Continuing the above example, the brake actuator may release and be pushed back by the brake assembly.

In various embodiments, as an electric motor or actuator is rotated it may generate electricity. A brake actuator may spin in reverse after applying a force, a voltage may thus be generated by the brake actuator. Large regen voltages may damage circuits that direct EMA 83 to apply force. Thus, EMAC 81 may contain a circuit (referred to as a regen circuit) to detect and dissipate this voltage (i.e. by dissipating a voltage detected over a threshold across a resistor bank). EMAC 81 may measure this voltage generated by EMA 83, which may be referred to as a regen voltage, by a circuit in the EMAC (Step 206). Continuing the above example, the regen voltage generated by the brake actuator spinning in reverse may be measured by the regen circuit of EMAC 81.

In various embodiments, EMAC 81 may determine a threshold voltage (Step 208). The expected regen voltage in a given application may be predictable based on the force applied. Thus, when EMA 83 is operating at reduced efficiency as a result of wear, the regen voltage produced by EMA 83 may be lower than the expected regen voltage. In that regard, the expected regen voltage from EMA 83 based on the applied force may be used by EMAC 81 to determine the threshold voltage at which EMA failure is likely.

In various embodiments, EMAC 81 may look up the expected regen voltage in a lookup table. The expected regen voltage may be used by EMAC 81 to calculate the threshold voltage. For example, the lookup table may include a percentage of maximum force applied by EMA 83, an expected regen voltage, and/or a minimum regen voltage threshold (See table T1, below). EMAC 81 may command the EMA 83 to apply 50% of the EMA's maximum rated force of 10,000 lbs, which would be 5,000 lbs, for example. EMAC 81 may determine the threshold voltage by looking up the expected voltage in the lookup table and calculate a percentage (e.g., 50%) of the expected voltage that corresponds to the threshold voltage. EMAC may also determine the threshold voltage by looking up a predetermined threshold voltage in the lookup table based on the force applied by EMA 83.

TABLE T1

Exemplary lookup table for associating a threshold voltage with an applied force.

| Force (% of Max) | Expected Voltage (V) | Threshold Voltage (V) |
|---|---|---|
| 10 | 30 | 15 |
| 25 | 50 | 25 |
| 50 | 150 | 75 |
| 75 | 250 | 125 |
| 100 | 500 | 250 |

In various embodiments, EMAC 81 may then compare the measured regen voltage to the threshold voltage (Step 210). The comparison may be done by comparing the measured regen voltage to a threshold voltage that is a percentage of the expected regen voltage, wherein a measured regen voltage below the threshold voltage may indicate EMA 83 is operating at low efficiency. Any percentage may be selected and programmed into EMAC 81 to indicate a desired efficiency threshold. Continuing the above example, the expected voltage generated by EMA 83 when applying 50% of maximum force (5,000 lbs in this example) may be 150 volts. EMAC 81 may measure a voltage of 70 volts being generated by EMA 83. The minimum threshold voltage when applying 50% force is 75 volts according to the lookup table T1. 70 volts is less than the minimum threshold voltage of 75 volts, therefore EMA 83 is not generating the minimum threshold voltage.

In various embodiments, EMAC 81 may respond to EMA 83 failing to generate the minimum threshold voltage in various ways. For example, EMAC 81 may comprise a counter to count the number of failed checks. EMAC 81 may increment the counter each time EMA 83 fails to generate the expected regen voltage. Once the counter exceeds a predetermined number, a repair signal may be generated. The repair signal may be sent to ground crews to indicate the actuator should be replaced.

Figure 3:
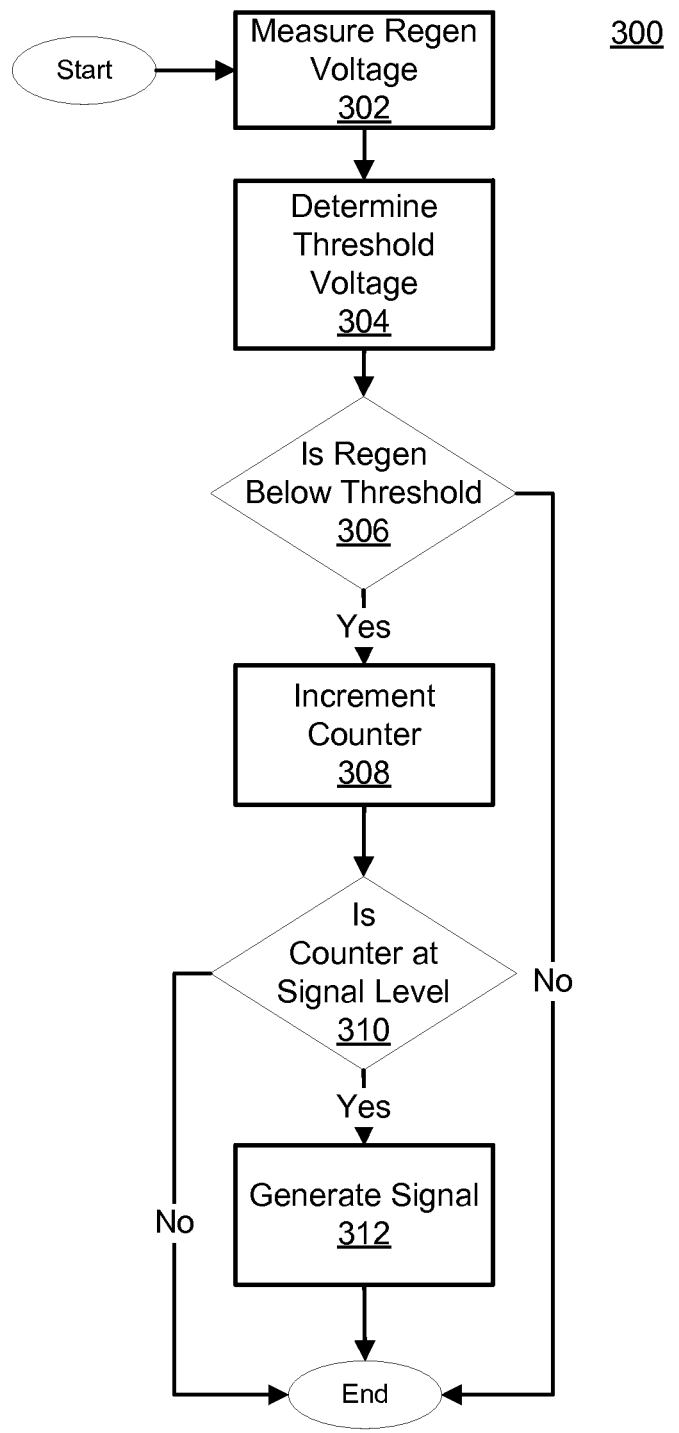
FIG. 3 is a flow chart depicting logical steps taken by an EMAC to detect EMA failure, in accordance with various embodiments.

With reference to FIG. 3, a logical chart 300 depicting steps taken by EMAC 81 is shown, in accordance with various embodiments. EMAC 81 may measure a regen voltage produced by EMA 81 (Step 302). EMAC 81 may then determine the threshold value, as described with reference to FIG. 2 above (Step 304). EMAC 81 may then check whether the measured regen voltage is below the threshold value (Step 306). If the measured regen voltage is below the threshold value then EMAC 81 may increment a counter (step 308). The counter may be used to track the number of failed tests by EMA 83. In that regard, a single bad test may not result in a false failure signal. If the regen voltage is above the threshold, then the test is complete and EMA 83 has passed. EMAC 81 may check whether the counter is at a level indicating a signal should be generated (Step 310). If the counter is at the signal level then EMAC may generate a repair signal (Step 312). If the counter is below the signal level then the test is complete with the failed test indicated by the incremented counter.

In various embodiments, the repair signal may be used to indicate to ground crews or flight crews that preventative maintenance may be appropriate. The repair signal may result in a warning displayed on a handheld device or terminal to inform ground crews. The repair signal may also be displayed in avionics in the cockpit. In various embodiments, an inefficient actuator may still operate, albeit with greater power consumption than a new actuator. In that regard, maintenance may be delayed until the aircraft is at a convenient location to change the actuator. By detecting reduced EMA efficiency, actuator control system 80 may enable preventative maintenance. Inefficient actuators may be replaced prior to complete failure. As a result, power consumption of EMA 83 over the life of the aircraft may be reduced.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electronic actuator control system, comprising:
   an electro-mechanical actuator (EMA) configured to generate a force; and
   an electro-mechanical actuator controller (EMAC) electrically coupled to the EMA, the EMAC comprising:
   a non-transitory memory communicating with the EMAC, the non-transitory memory having instructions stored thereon that, in response to execution by the EMAC, cause the EMAC to perform operations comprising:
   commanding, by the EMAC, the EMA to apply the force;
   cutting, by the EMAC, power to the EMA;
   measuring, by the EMAC, a regenerative voltage generated by the EMA;
   determining, by the EMAC, an expected regenerative voltage based on the force;
   comparing, by the EMAC, the regenerative voltage generated by the EMA to the expected regenerative voltage to determine an efficiency of the EMA; and
   generating, by the EMAC, a repair signal in response to the regenerative voltage being less than a minimum regenerative voltage threshold.

2. The electronic actuator control system of claim 1, wherein the force has a predetermined amplitude.

3. The electronic actuator control system of claim 2, wherein the regenerative voltage is generated by the EMA in response to the EMAC cutting power to the EMA.

4. The electronic actuator control system of claim 1, wherein the determining of the expected regenerative voltage based on the force further comprises looking up the force in a lookup table.

5. The electronic actuator control system of claim 4, wherein the lookup table associates the force with the expected regenerative voltage.

6. The electronic actuator control system of claim 5, wherein the lookup table associates the force with the minimum regenerative voltage threshold.

7. The electronic actuator control system of claim 1, wherein the minimum regenerative voltage threshold is 50% of the expected regenerative voltage.

8. A method of detecting electro-mechanical actuator failure, comprising:
   commanding an electro-mechanical actuator (EMA) to apply a force;
   cutting power to the EMA;
   measuring a regenerative voltage generated by the EMA;
   determining an expected regenerative voltage in response to the force;
   comparing the regenerative voltage generated by the EMA to the expected regenerative voltage to determine an efficiency of the EMA;
   generating a repair signal in response to the regenerative voltage being less than a minimum regenerative voltage threshold;
   performing a maintenance check of the EMA in response to the repair signal.

9. The method of claim 8, wherein the force has a predetermined amplitude.

10. The method of claim 8, wherein the regenerative voltage is generated by the EMA in response to an electro-mechanical actuator controller (EMAC) cutting power to the EMA.

11. The method of claim 8, wherein the determining the expected regenerative voltage in response to the force further comprises looking up the force in a lookup table.

12. The method of claim 11, wherein the lookup table associates the force with the minimum regenerative voltage threshold.

13. The method of claim 8, wherein the minimum regenerative voltage threshold is 50% of the expected regenerative voltage.

* * * * *